United States Patent
Kim

(10) Patent No.: US 12,312,022 B2
(45) Date of Patent: May 27, 2025

(54) METHOD AND APPARATUS FOR CONTROLLING ELECTRIC POWER STEERING SYSTEM

(71) Applicant: HL MANDO CORPORATION, Gyeonggi-do (KR)

(72) Inventor: Tae Hyoung Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 201 days.

(21) Appl. No.: 18/196,853

(22) Filed: May 12, 2023

(65) Prior Publication Data

US 2024/0059347 A1   Feb. 22, 2024

(30) Foreign Application Priority Data

Aug. 18, 2022   (KR) .......................... 10-2022-0103303

(51) Int. Cl.
   *G06F 1/12*   (2006.01)
   *B62D 5/04*   (2006.01)

(52) U.S. Cl.
   CPC ............. *B62D 5/046* (2013.01); *B62D 5/049* (2013.01); *B62D 5/0493* (2013.01)

(58) Field of Classification Search
   CPC ....... B62D 5/046; B62D 5/049; B62D 5/0493
   See application file for complete search history.

(56) References Cited

U.S. PATENT DOCUMENTS

| 11,242,087 B2* | 2/2022 | Taki ........................ B62D 6/00 |
| 2006/0113938 A1* | 6/2006 | Arai ........................ H02P 27/08 |
| | | 318/432 |
| 2008/0294313 A1* | 11/2008 | Aoki .................... B62D 5/0463 |
| | | 701/43 |
| 2021/0344400 A1 | 11/2021 | Gupta et al. |

FOREIGN PATENT DOCUMENTS

| JP | 5739850 | 6/2015 |
| KR | 10-2021-0075364 | 6/2021 |

* cited by examiner

*Primary Examiner* — Gonzalo Laguarda
(74) *Attorney, Agent, or Firm* — WOMBLE BOND DICKINSON (US) LLP

(57) ABSTRACT

For a method and apparatus for controlling an electric power steering system, the method includes driving a first timer synchronized with a control signal of a motor included in the electric power steering system, driving a second timer synchronized with the first timer, updating a first sensor value of the electric power steering system according to a period of the first timer at a pre-determined time corresponding to the period of the first timer, determining a sensor value update error in the updating according to the period of the first timer, and updating a second sensor value of the electric power steering system according to a period of the second timer at a pre-determined time corresponding to the period of the second timer, according to the sensor value update error.

21 Claims, 6 Drawing Sheets

METHOD AND APPARATUS FOR CONTROLLING ELECTRIC POWER STEERING SYSTEM

CROSS-REFERENCE TO RELATED APPLICATIONS

This application is based on and claims priority under 35 U.S.C. § 119 to Korean Patent Application No. 10-2022-0103303, filed on Aug. 18, 2022, in the Korean Intellectual Property Office, the disclosure of which is incorporated by reference herein in its entirety.

BACKGROUND

1. Field

The disclosure relates to a method and apparatus for controlling an electric power steering system.

2. Description of the Related Art

A motor driven power steering (MDPS) system is an electric power steering system and uses a motor to assist the steering of a steering wheel. A micro controller unit (MCU) of the MDPS system may receive a plurality of sensor values from an analog-to-digital converter (ADC) and control a motor on the basis of the received sensor values.

When an error occurs in reception of a sensor value from the ADC, the MCU may not update the sensor value of the ADC in an erroneous period, causing a system error. For example, when an error occurs in reception of a sensor value from the ADC during driving, assistance of the MDPS system may be off, causing a risk in terms of safety of a driver.

SUMMARY

Provided is a method and apparatus for controlling an electric power steering system. However, such a problem is an example, and the scope of the disclosure is not limited thereto.

Additional aspects will be set forth in part in the description which follows and, in part, will be apparent from the description, or may be learned by practice of the presented embodiments of the disclosure.

According to an aspect of the disclosure, a method of controlling an electric power steering system includes driving a first timer synchronized with a control signal of a motor included in the electric power steering system, driving a second timer synchronized with the first timer, updating a first sensor value of the electric power steering system according to a period of the first timer at a pre-determined time corresponding to the period of the first timer, determining a sensor value update error in the updating according to the period of the first timer, and updating a second sensor value of the electric power steering system according to a period of the second timer at a pre-determined time corresponding to the period of the second timer, according to the sensor value update error.

The driving of the first timer may include driving a first pulse width modulation (PWM) timer synchronized with a PWM control signal of the motor.

The driving of the second timer may include driving a second PWM timer synchronized with the period of the first timer.

The updating according to the period of the first timer may include updating the first sensor value received from a converter of the electric power steering system at a pre-determined time having a period synchronized with the period of the first timer.

The updating according to the period of the first timer may include updating the first sensor value at a time corresponding to an intermediate point of a first unit signal of the first timer.

The updating according to the period of the first timer may include updating the first sensor value received from a converter of the electric power steering system at a pre-determined time having a period synchronized with a period of a control signal of the motor.

The determining of the sensor value update error may include determining whether the updating of the first sensor value is delayed from the pre-determined time.

The determining of the sensor value update error may include determining whether the updating of the first sensor value is performed in an abnormal period distinguished from the period of the first timer.

The updating according to the period of the second timer may include changing a timer, which is a reference for sensor value updating, from the first timer to the second timer.

The updating according to the period of the second timer may include updating the second sensor value received from a converter of the electric power steering system at a pre-determined time having a period synchronized with the period of the second timer.

According to another aspect of the disclosure, a computer program is provided which is stored on a recording medium for executing the above-described method by using a computer.

According to an aspect of the disclosure, a method of controlling an electric power steering system includes a processor which is configured to: drive a first timer synchronized with a control signal of a motor included in the electric power steering system; drive a second timer synchronized with the first timer; update a first sensor value of the electric power steering system according to a period of the first timer at a pre-determined time corresponding to the period of the first timer; determine a sensor value update error in the updating according to the period of the first timer; and update a second sensor value of the electric power steering system according to a period of the second timer at a pre-determined time corresponding to the period of the second timer, according to the sensor value update error.

The processor may be further configured to drive a first pulse width modulation (PWM) timer synchronized with a PWM control signal of the motor.

The processor may be further configured to drive a second PWM timer synchronized with a period of the first timer.

The processor may be further configured to update the first sensor value received from a converter of the electric power steering system at a pre-determined time having a period synchronized with the period of the first timer.

The processor may be further configured to update the first sensor value at a time corresponding to an intermediate point of a first unit signal of the first timer.

The processor may be further configured to update the first sensor value received from a converter of the electric power steering system at a pre-determined time having a period synchronized with a period of a control signal of the motor.

The processor may be further configured to determine whether the updating of the first sensor value is delayed from the pre-determined time.

The processor may be further configured to determine whether the updating of the first sensor value is performed in an abnormal period distinguished from the period of the first timer.

The processor may be further configured to change a timer, which is a reference for sensor value updating, from the first timer to the second timer.

The processor may be further configured to update the second sensor value received from a converter of the electric power steering system at a pre-determined time having a period synchronized with the period of the second timer.

Other aspects, features and advantages than described above will become apparent from the detailed description, claims, and drawings for carrying out the disclosure below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
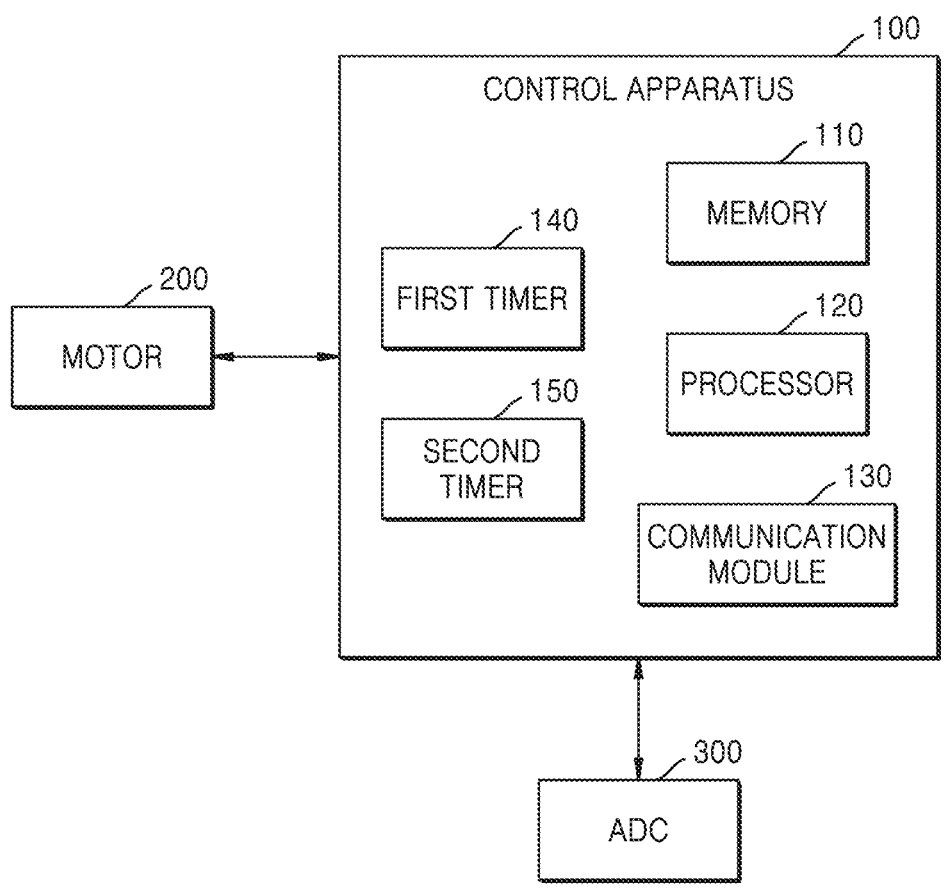
FIG. 1 is a view for describing a configuration and an operation of an apparatus for controlling an electric power steering system, according to an embodiment.

Reference will now be made in detail to embodiments, examples of which are illustrated in the accompanying drawings, wherein like reference numerals refer to like components throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of components, modify the entire list of components and do not modify the individual components of the list.

The present disclosure may have various modifications thereto and various embodiments, and thus particular embodiments will be illustrated in the drawings and described in detail in a detailed description. Effects and features of the present disclosure, and a method of achieving them will be apparent with reference to the embodiments described in detail in conjunction with the drawings. However, the disclosure is not limited to the embodiments disclosed below, but may be implemented in various forms.

Hereinafter, embodiments of the disclosure will be described in detail with reference to the accompanying drawings, and in description with reference to the drawings, the same or corresponding components are given the same reference numerals, and redundant description thereto will be omitted.

In the following embodiments, the terms such as first, second, etc., have been used to distinguish one component from other components, rather than limiting. Singular forms include plural forms unless apparently indicated otherwise contextually. Herein, the terms "include", "have", or the like, are intended to mean that there are features, or components, described herein, but do not preclude the possibility of adding one or more other features or components.

In the drawings, the size of components may be exaggerated or reduced for convenience of description. For example, the size and thickness of each component shown in the drawings are shown for convenience of description, and thus the disclosure is not necessarily limited to the illustration.

In the following embodiments, when a portion, such as a region, a component, a portion or unit, a block, a module, etc., is present on or above another portion, this case may include not only a case where it is directly on the other portion, but also a case where another region, component, portion or unit, block, module, etc., is arranged between the portion and the other portion. In the following embodiments, when a region, a component, a portion or unit, a block, a module, etc., are connected, this case may include not only a case where a region, a component, a portion or unit, a block, and a module are directly connected, but also a case where they are connected indirectly by another region, component, portion or unit, block, and module arranged therebetween.

Hereinbelow, various embodiments of the disclosure will be described in detail with reference to the accompanying drawings so that those of ordinary skill in the art may easily practice the disclosure.

Figure 2:
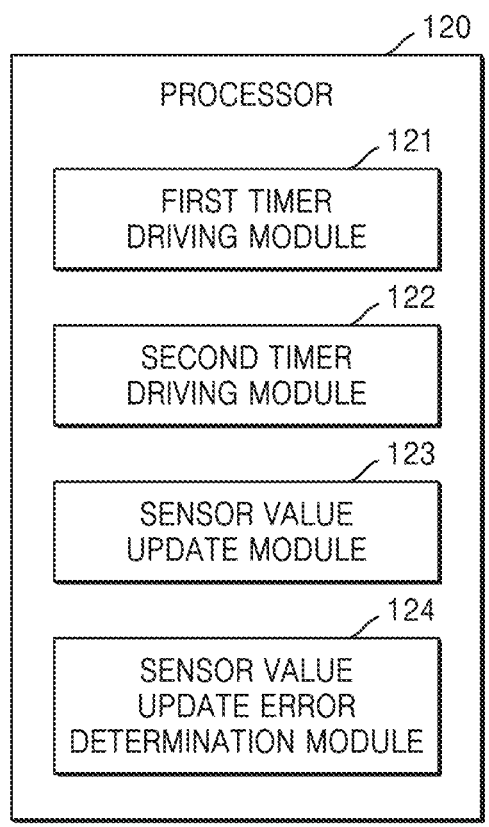
FIG. 2 is a view for describing a configuration of a processor of an apparatus for controlling an electric power steering system, according to an embodiment.

FIG. 1 is a view for describing a configuration and an operation of an apparatus for controlling an electric power steering system, according to an embodiment, and FIG. 2 is a view for describing a configuration of a processor of the apparatus according to an embodiment.

First, referring to FIG. 1, an apparatus 100 for controlling an electric power steering system (hereinafter, the control apparatus 100, for short), according to an embodiment, may include a memory 110, a processor 120, a communication module 130, a first timer 140, and a second timer 150. However, the disclosure is not limited thereto, and the control apparatus 100 may further include other components or some components may be omitted therefrom. Some components of the control apparatus 100 may be separated into a plurality of devices, or a plurality of components of the control apparatus 100 may be integrated into one device. For example, as shown in FIG. 1, the control apparatus 100 may be electrically connected to a motor 200 to exchange data with the motor 200. The control apparatus 100 may also be electrically connected to an analog-to-digital converter (ADC) 300 to exchange data with the ADC 300.

The first timer 140 may be a pulse width modulation (PWM) timer. For example, a period of the first timer 140 may be about 50 μsec. The first timer 140 may be a timer synchronized with a control signal of the motor 200.

The second timer 150 may be a pulse width modulation (PWM) timer. For example, a period of the second timer 140 may be about 50 μsec. For example, the second timer 150 may be synchronized with the first timer 140 such that the second timer 150 may have the same period as the first timer 140.

The motor 200 may be a steering wheel motor included in the electric power steering system. For example, the motor 200 may receive the control signal from the control apparatus 100.

The ADC 300 may be a converter that converts an analog sensor value of the electric power steering system into a digital sensor value. For example, the ADC 300 may transmit the sensor value of the electric power steering system to the control apparatus 100. For example, the ADC 300 may transmit a torque sensor power value to the control apparatus 100.

The memory 110 may be a computer-readable recording medium and include a permanent mass storage device such as random access memory (RAM), read only memory (ROM), and a disk drive. A program code for controlling the control apparatus 100 may be temporarily or permanently stored in the memory 110.

The processor 120 may drive the first timer 140 synchronized with the control signal of the motor 200 included in the electric power steering system. The processor 120 may also drive the second timer 150 synchronized with the first timer 140. The processor 120 may update a first sensor value of the electric power steering system according to a period of the first timer 140 at a pre-determined time corresponding to the period of the first timer 140. The processor 120 may also determine a sensor value update error of the first sensor value. The processor 120 may update a second sensor value of the electric power steering system according to a period of the second timer 150 at a pre-determined time corresponding to the period of the second timer 150, according to the sensor value update error.

The communication module 130 may provide a function for communication with an external server through a network. For example, a request generated by the processor 120 of the control apparatus 100 according to a program code stored in a recording device such as the memory 110 may be transmitted to the external server through the network under control of the communication module 130. Inversely, a control signal, an instruction, contents, a file, etc., provided under control of a processor of the external server may be received by the control apparatus 100 through the communication module 130 via the network. For example, the control signal, the instruction, etc., of the external server received through the communication module 130 may be transmitted to the processor 120 or the memory 110.

A communication scheme is not limited and may include short-range wireless communication between devices as well as communications using a communication network (e.g., a mobile communication network, wired Internet, wireless Internet, a broadcast network). For example, the network may include one or more networks among a personal area network (PAN), a local area network (LAN), a campus area network (CAN), a metropolitan area network (MAN), a wide area network (WAN), a broadband network (BBN), Internet, etc. Moreover, the network may include, but not limited to, one or more of network topology including a bus network, a start network, a ring network, a mesh network, a star-bus network, a tree or hierarchical network, etc.

The communication module 130 may communicate with the external server through a network. The communication scheme is not limited, but the network may be a short-range wireless communication network. For example, the network may be a Bluetooth, Bluetooth low energy (BLE), or wireless fidelity (WiFi) communication network.

The control apparatus 100 according to the disclosure may include an input/output interface. The input/output interface may be a means for an interface with an input/output device. For example, the input device may include a keyboard, a mouse, etc., and the output device may include a display for displaying a communication session of an application, etc. In another example, the input/output interface may be a means for an interface with a device in which a function for input and a function for output are integrated into one, such as a touch screen. More specifically, when the processor 120 of the control apparatus 100 processes a command of a computer program loaded in the memory 110, a service screen or content configured using data provided by the external server may be displayed on a display through the input/output interface.

Moreover, in other embodiments, the control apparatus 100 may include more components than those of FIG. 1. For example, the control apparatus 100 may be implemented to include at least a part of the input/output device or may further include other components such as a battery and a charging device that supply power to internal components, various sensors, a database, etc.

Hereinbelow, an internal configuration of the processor 120 of the control apparatus 100 according to an embodiment will be described in detail. The processor 120 described below is assumed to be the processor 120 of the control apparatus 100 shown in FIG. 1 to facilitate understanding.

The processor 120 of the control apparatus 100 according to an embodiment may include a first timer driving module 121, a second timer driving module 122, a sensor value update module 123, and a sensor value update error determination module 124. According to some embodiments, components of the processor 120 may be selectively included in or excluded from the processor 120. Moreover, according to some embodiments, the components of the processor 120 may be separated or merged to represent a function of the processor 120.

Figure 3:
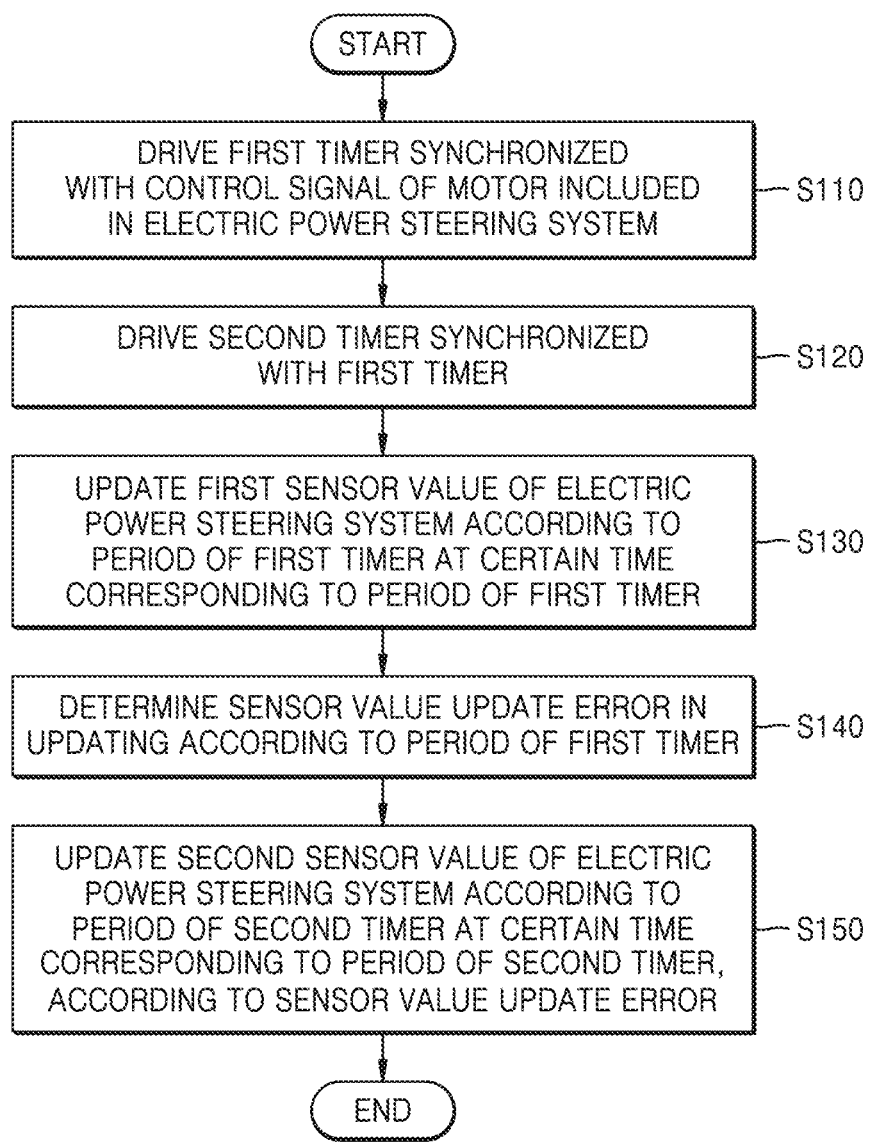
FIG. 3 is a flowchart of a method of controlling an electric power steering system, according to an embodiment.

The processor 120 and the components thereof may control the control apparatus 100 to perform operations S110 to S150 included in the method of FIG. 3. For example, the processor 120 and the components thereof may be implemented to execute instructions corresponding to a code of an operating system and a code of at least one program included in the memory 110. Herein, the components of the processor 120 may be representations of different functions of the processor 120, executed by the processor 120, according to an instruction provided by a program code stored in the control apparatus 100. The internal configuration and the detailed operation of the processor 120 will be described with reference to the flowchart of the method of FIG. 3.

FIG. 3 is a flowchart of a method of controlling an electric power steering system, according to an embodiment.

Referring to FIG. 3, in operation S110, the control apparatus 100 may drive a first timer synchronized with a control signal of a motor included in an electric power steering system. For example, the control apparatus 100 according to an embodiment may drive a first PWM timer synchronized with a PWM control signal of the motor.

In operation S120, the control apparatus 100 may drive a second timer synchronized with the first timer. For example, the control apparatus 100 according to an embodiment may drive a second PWM timer synchronized with a period of the first timer.

In operation S130, the control apparatus 100 may update a first sensor value of the electric power steering system according to a period of the first timer at a pre-determined time corresponding to the period of the first timer. For example, the control apparatus 100 according to an embodiment may update the first sensor value received from a converter of the electric power steering system at a pre-determined time having a period synchronized with the period of the first timer.

Moreover, the control apparatus 100 according to an embodiment may update the first sensor value at a pre-determined time corresponding to an intermediate point of a first unit signal of the first timer.

The control apparatus 100 according to an embodiment may update the first sensor value received from the converter of the electric power steering system at a pre-determined time having a period synchronized with a period of a control signal of a motor.

In operation S140, the control apparatus 100 may determine a sensor value update error of the first sensor value in the operation of updating the first sensor value according to the period of the first timer. For example, the control apparatus 100 according to an embodiment may determine whether updating of the first sensor value is delayed from a pre-determined time.

The control apparatus 100 according to an embodiment may determine whether updating of the first sensor value is performed in an abnormal period distinguished from the period of the first timer.

In operation S150, the control apparatus 100 may update a second sensor value of the electric power steering system according to a period of the second timer at a pre-determined time corresponding to the period of the second timer, according to the sensor value update error.

The control apparatus 100 according to an embodiment may change a timer, which is a reference for updating a sensor value, from the first timer to the second timer.

The control apparatus 100 according to an embodiment may update the second sensor value received from the converter of the electric power steering system at a pre-determined time having a period synchronized with the period of the second timer.

Figure 4:
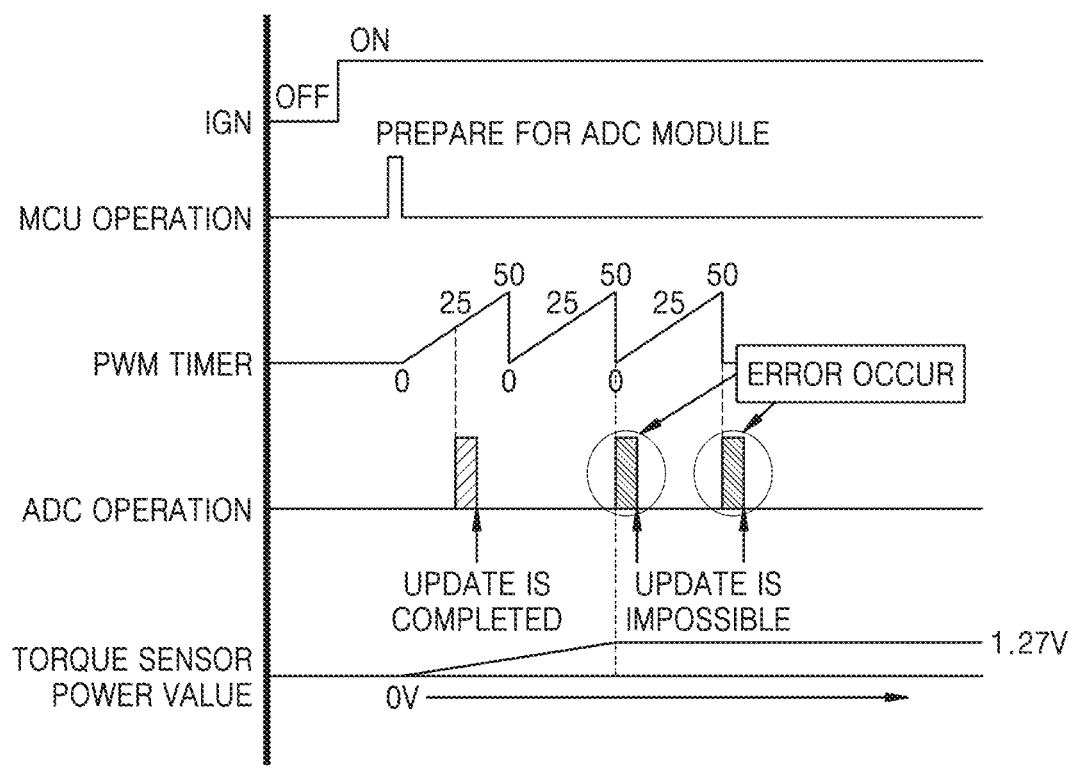
FIGS. 4 and 5 are views for describing a method of controlling an electric power steering system, according to an embodiment.
Figure 5:
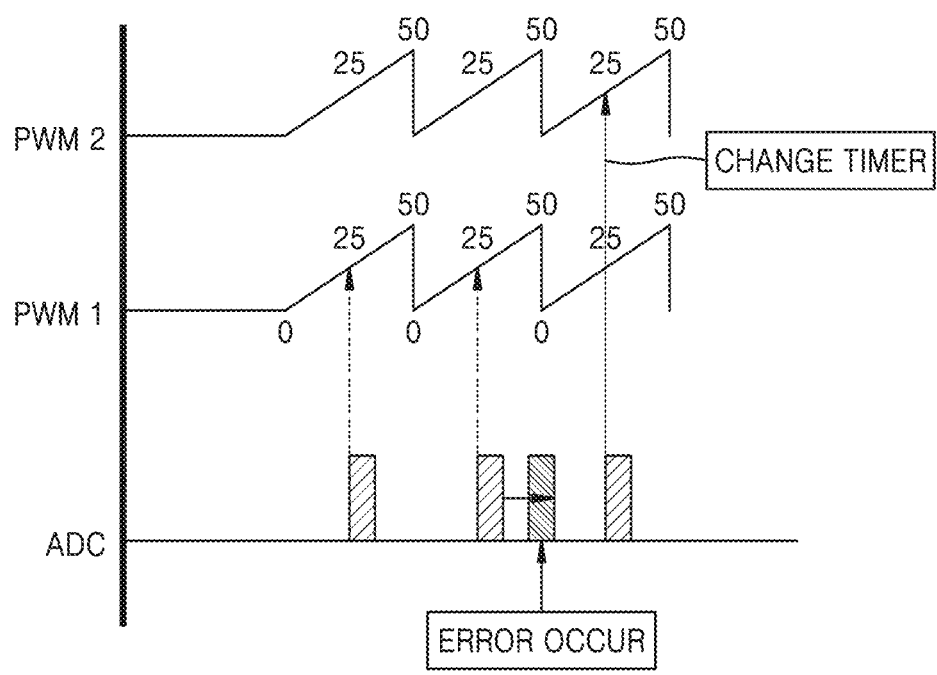

FIGS. 4 and 5 are views for describing a method of controlling an electric power steering system, according to an embodiment.

FIG. 4 shows a case where an ADC sensor value update error occurs in an existing electric power steering system.

For example, as shown in FIG. 4, in the related art, a period of a PWM timer is set to 50 μsec and an ADC sensor value is updated when the timer exceeds 25 μsec, but when a delay occurs in an ADC sensor value update operation time, an MCU generates an ADC-related error and does not update an ADC value in an erroneous period, resulting in a sensor-related system error. For example, as the ADC sensor value update is not possible, an EPS torque sensor power value is fixed at 1.27 v and thus a voltage is low and 30 ms is exceeded (e.g., the low voltage is less than 4.5 v), causing danger in terms of driver safety such as heavy steering wheels.

Referring to FIG. 5, a view is shown for describing a method of controlling an electric power steering system, according to an embodiment.

A PWM timer 1 (existing) and a PWM timer 2 (additional) may be set to the same period. When an error occurs in the PWM timer 1 operating as a reference timer for an ADC sensor value update operation, the PWM timer 2 may be set to a reference timer of the ADC sensor value update operation.

According to the disclosure, the MDPS operation may be continued by resolving the sensor value update impossible state caused by the ADC sensor value update error, and an auxiliary PWM timer may be added, thereby merely maintaining one ADC channel when compared to an ADC channel redundant structure and thus reducing a CPU burden in terms of MCU performance.

Figure 6:
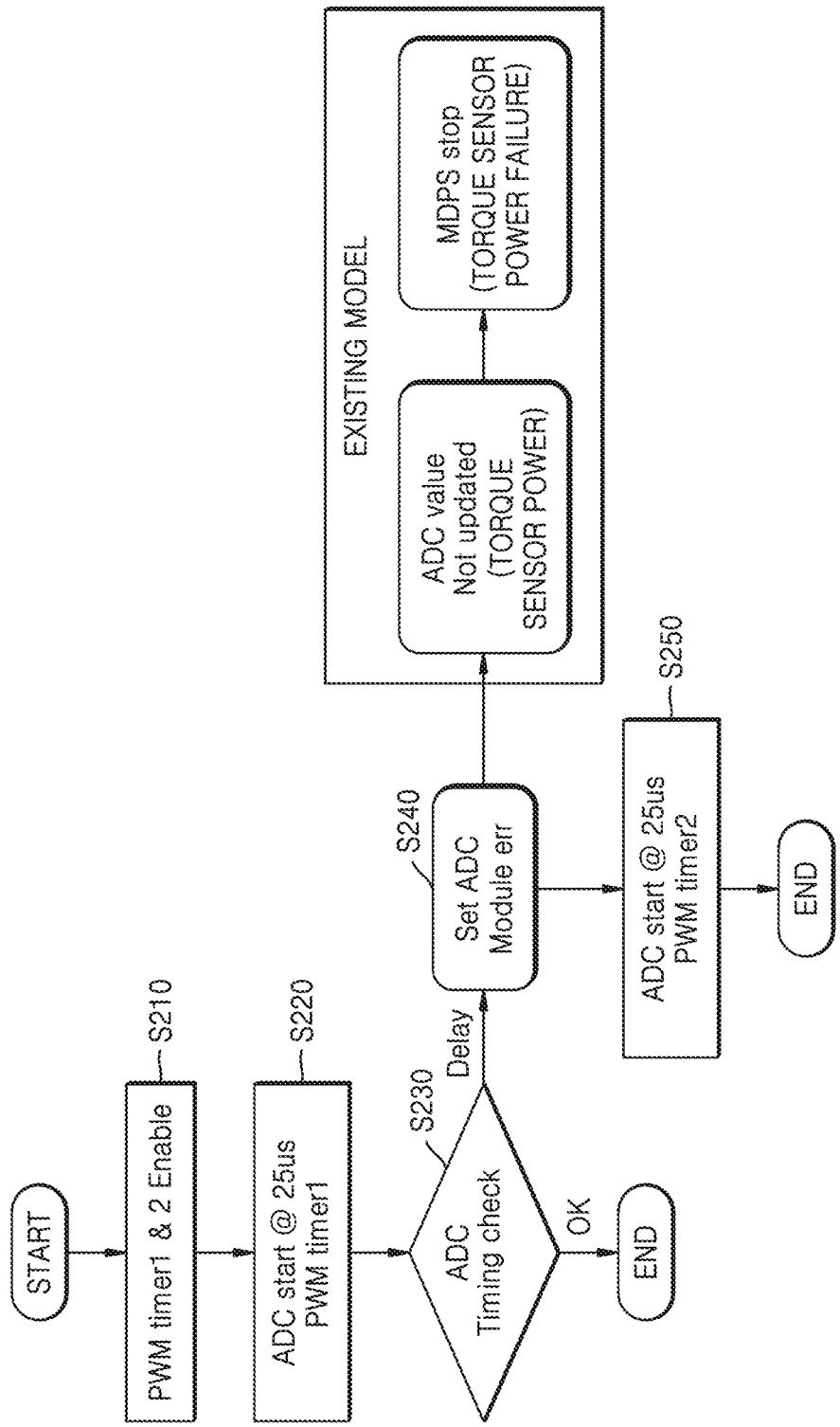
FIG. 6 is a flowchart of a method of controlling an electric power steering system, according to another embodiment.

FIG. 6 is a flowchart of a method of controlling an electric power steering system, according to another embodiment.

Referring to FIG. 6, in operation S210, the control apparatus 100 may drive the PWM timer 1 and the PWM timer 2. For example, the PWM timer 1 and the PWM timer 2 may be timers synchronized with each other and having the same period.

In operation S220, the control apparatus 100 may update an ADC sensor value with the PWM timer 1 as the reference timer.

In operation S230, the control apparatus 100 may determine whether an update time of an ADC sensor value updated with the PWM timer 1 as the reference timer is delayed.

In operation S240, the control apparatus 100 may determine an update error of the ADC sensor value when the update time of the ADC sensor is delayed.

In operation S250, the control apparatus 100 may change the reference timer of the ADC sensor value update operation from the PWM timer 1 to the PWM timer 2 according to the update error of the ADC sensor value and update the ADC sensor value.

According to the disclosure, an auxiliary PWM timer may be added to i) a basic PWM timer operating an ADC, and the auxiliary PWM timer may be configured to ii) determine whether updating of an ADC sensor value is delayed and iiii) operate in the same time period as the basic PWM timer such that a main timer may be switched to the auxiliary PWM timer when an error occurs in the basic PWM timer.

Therefore, according to the disclosure, it is possible to prevent malfunctions such as stopping of the MDPS due to non-updating of a torque sensor value occurring due to an update error of the ADC sensor value in an existing model.

The apparatus and/or system described above may be implemented by a hardware component, a software component, and/or a combination of the hardware component and the software component. The apparatus and components described in the embodiments may be implemented using one or more general-purpose or special-purpose computers such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications running on the OS. The processing device may access, store, manipulate, process, and generate data in response to execution of software. For convenience of understanding, it is described that one processing device is used, but those of ordinary skill in the art would recognize that the processing device includes a plurality of processing components and/or a plurality of types of processing components. For example, the processing device may include a plurality of processors or one processor and one controller. Alternatively, other processing configurations such as parallel processors may be possible.

Software may include a computer program, a code, an instruction, or a combination of one or more thereof, and may configure a processing device to operate as desired or independently or collectively instruct the processing device. The software and/or data may be permanently or temporarily embedded in any type of machine, component, physical device, virtual equipment, computer storage medium or device, or signal wave to be transmitted, so as to be interpreted by or to provide instructions or data to the processing device. The software may be distributed over computer systems connected through a network and may be stored or executed in a distributed manner. The software and data may be stored in one or more computer-readable recording media.

The method according to the embodiments may be implemented in the form of program commands that can be executed through various computer components and recorded in a computer-readable recording medium. The computer-readable recording medium may include a program command, a data file, a data structure, etc., alone or in a combined manner. The program command recorded in the medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. Examples of the program command may include not only a machine language code created by a complier, but also a high-level language code executable by a computer using an interpreter. The foregoing hardware device may be configured to be operated as at least one software module to perform an operation of the embodiments, or vice versa.

While embodiments of the disclosure have been described by the limited embodiments of the disclosure and drawings, various modifications and changes may be made from the disclosure by those of ordinary skill in the art. For example, even when described techniques are performed in a sequence different from the described method and/or components such as systems, structures, devices, circuits, etc. are combined or connected differently from the described method, or replaced with other components or equivalents, an appropriate result may be achieved.

Therefore, other implementations, other embodiments, and equivalents to the claims may also fall within the scope of the claims provided below.

According to an embodiment of the disclosure, a method and apparatus for controlling an electric power steering system may be implemented which may effectively maintain an MDPS operation by addressing a state where updating of the sensor value is not possible due to the ADC sensor value update error. However, the scope of the disclosure is not limited by the effect.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of controlling an electric power steering system, the method comprising:
    driving a first timer synchronized with a control signal of a motor included in the electric power steering system;
    driving a second timer synchronized with the first timer;
    updating a first sensor value of the electric power steering system according to a period of the first timer at a pre-determined time corresponding to the period of the first timer;
    determining a sensor value update error in the updating according to the period of the first timer; and
    updating a second sensor value of the electric power steering system according to a period of the second timer at a pre-determined time corresponding to the period of the second timer, according to the sensor value update error.

2. The method of claim 1, wherein the driving of the first timer comprises driving a first pulse width modulation (PWM) timer synchronized with a PWM control signal of the motor.

3. The method of claim 1, wherein the driving of the second timer comprises driving a second PWM timer synchronized with the period of the first timer.

4. The method of claim 1, wherein the updating according to the period of the first timer comprises updating the first sensor value received from a converter of the electric power steering system at a pre-determined time having a period synchronized with the period of the first timer.

5. The method of claim 4, wherein the updating according to the period of the first timer comprises updating the first sensor value at a time corresponding to an intermediate point of a first unit signal of the first timer.

6. The method of claim 1, wherein the updating according to the period of the first timer comprises updating the first sensor value received from a converter of the electric power steering system, at a pre-determined time having a period synchronized with a period of a control signal of the motor.

7. The method of claim 1, wherein the determining of the sensor value update error comprises determining whether the updating of the first sensor value is delayed from the pre-determined time.

8. The method of claim 7, wherein the determining of the sensor value update error comprises determining whether the updating of the first sensor value is performed in an abnormal period distinguished from the period of the first timer.

9. The method of claim 1, wherein the updating according to the period of the second timer comprises changing a timer, which is a reference for sensor value updating, from the first timer to the second timer.

10. The method of claim 9, wherein the updating according to the period of the second timer comprises updating the second sensor value received from a converter of the electric power steering system, at a pre-determined time having a period synchronized with the period of the second timer.

11. A computer program stored on a recording medium for executing the method according to claim 1 by using a computing device.

12. An apparatus for controlling an electric power steering system, the apparatus comprising a processor,
    wherein the processor is configured to: drive a first timer synchronized with a control signal of a motor included in the electric power steering system; drive a second timer synchronized with the first timer; update a first sensor value of the electric power steering system according to a period of the first timer at a pre-determined time corresponding to the period of the first timer; determine a sensor value update error in the updating according to the period of the first timer; and update a second sensor value of the electric power steering system according to a period of the second timer at a pre- determined time corresponding to the period of the second timer, according to the sensor value update error.

13. The apparatus of claim 12, wherein the processor is further configured to drive a first pulse width modulation (PWM) timer synchronized with a PWM control signal of the motor.

14. The apparatus of claim 12, wherein the processor is further configured to drive a second PWM timer synchronized with a period of the first timer.

15. The apparatus of claim 12, wherein the processor is further configured to update the first sensor value received from a converter of the electric power steering system, at a pre-determined time having a period synchronized with the period of the first timer.

16. The apparatus of claim 15, wherein the processor is further configured to update the first sensor value at a time corresponding to an intermediate point of a first unit signal of the first timer.

17. The apparatus of claim 12, wherein the processor is further configured to update the first sensor value received from a converter of the electric power steering system, at a pre-determined time having a period synchronized with a period of a control signal of the motor.

18. The apparatus of claim 12, wherein the processor is further configured to determine whether the updating of the first sensor value is delayed from the pre-determined time.

19. The apparatus of claim 18, wherein the processor is further configured to determine whether the updating of the first sensor value is performed in an abnormal period distinguished from the period of the first timer.

20. The apparatus of claim 12, wherein the processor is further configured to change a timer, which is a reference for sensor value updating, from the first timer to the second timer.

21. The apparatus of claim 20, wherein the processor is further configured to update the second sensor value received from a converter of the electric power steering system, at a pre-determined time having a period synchronized with the period of the second timer.

* * * * *